US011396147B2

(12) United States Patent
Kawano et al.

(10) Patent No.: US 11,396,147 B2
(45) Date of Patent: Jul. 26, 2022

(54) PREPREG AUTOMATIC LAYERING DEVICE

(71) Applicant: MITSUBISHI HEAVY INDUSTRIES, LTD., Tokyo (JP)

(72) Inventors: Masayuki Kawano, Tokyo (JP); Yukiharu Yamasaki, Tokyo (JP); Yukifumi Toyama, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/260,282

(22) PCT Filed: Aug. 14, 2019

(86) PCT No.: PCT/JP2019/031948
§ 371 (c)(1),
(2) Date: Jan. 14, 2021

(87) PCT Pub. No.: WO2020/084875
PCT Pub. Date: Apr. 30, 2020

(65) Prior Publication Data
US 2021/0299983 A1 Sep. 30, 2021

(30) Foreign Application Priority Data
Oct. 24, 2018 (JP) .............................. JP2018-200319

(51) Int. Cl.
*B29C 70/54* (2006.01)
*B29C 70/38* (2006.01)

(52) U.S. Cl.
CPC .......... *B29C 70/545* (2013.01); *B29C 70/386* (2013.01)

(58) Field of Classification Search
CPC ......... B29C 70/16; B29C 43/20; B29C 70/46; B29C 70/38; B29C 43/34; B29C 70/386; B29C 70/545
See application file for complete search history.

(56) References Cited

U.S. PATENT DOCUMENTS

2012/0298309 A1* 11/2012 Arakawa ............... B29C 70/388
156/538
2015/0328876 A1* 11/2015 Nishimura .............. B32B 41/00
156/64

FOREIGN PATENT DOCUMENTS

JP 5422439 B2 2/2014

OTHER PUBLICATIONS

International Search Report and Written Opinion of International Application No. PCT/JP2019/031948 dated Oct. 29, 2019; 11pp.

* cited by examiner

*Primary Examiner* — Vishal I Patel
(74) *Attorney, Agent, or Firm* — Kanesaka Berner and Partners LLP

(57) ABSTRACT

A prepreg automatic layering device includes a rotary die-cutter, a cutting mechanism and a control device. The rotary die-cutter, by cutting a prepreg sheet only in the width direction, cuts out a prepreg cut-out section in which a prepreg cut section and an unnecessary portion are integrated. The cutting mechanism is disposed before a layering stage, and separates a portion corresponding to the prepreg cut section and a portion corresponding to the unnecessary portion by cutting the prepreg sheet in the direction in which the prepreg sheet is conveyed. The control device controls the cutting mechanism.

9 Claims, 6 Drawing Sheets

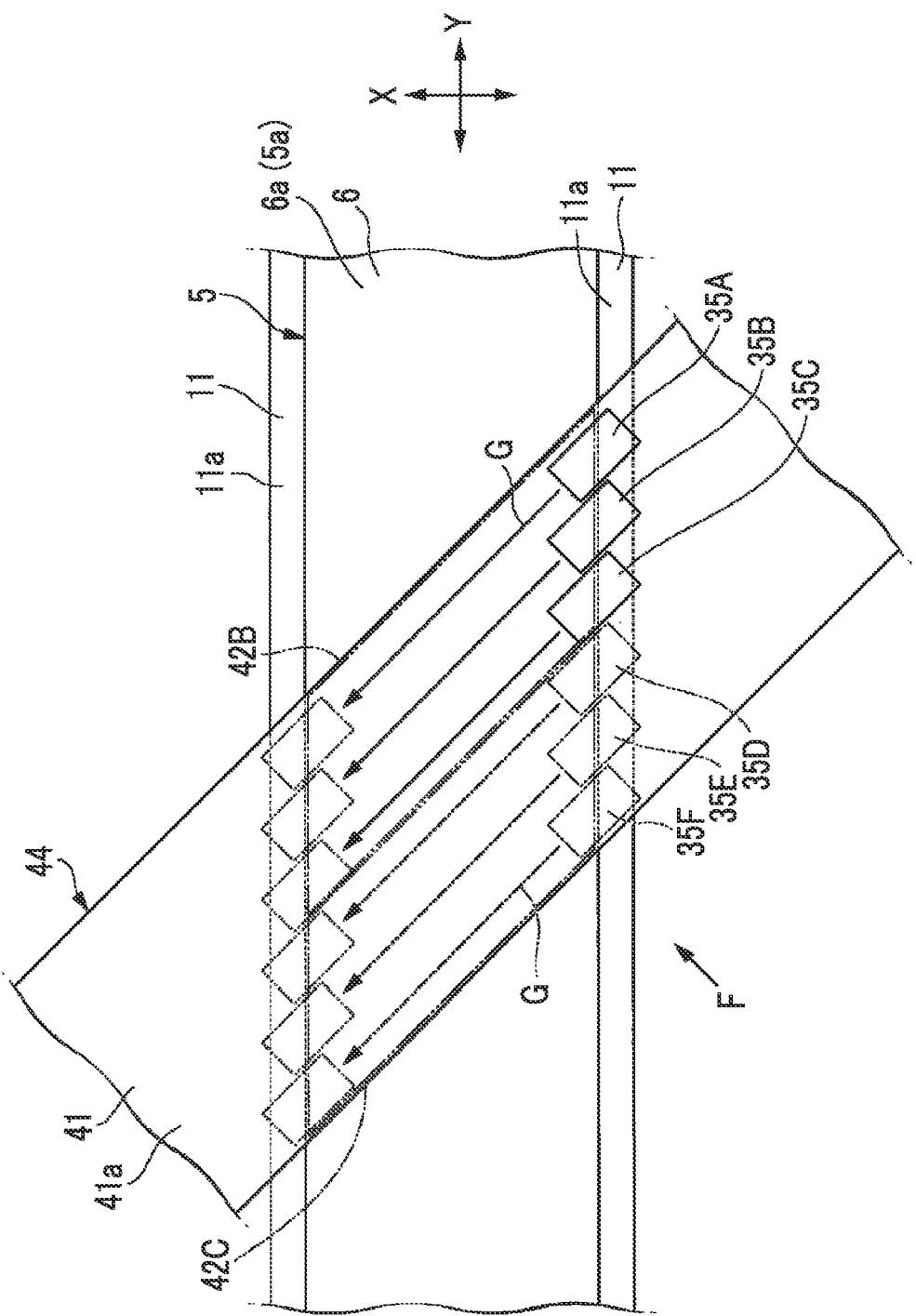

PREPREG AUTOMATIC LAYERING DEVICE

RELATED APPLICATIONS

The present application is a National Phase of International Application Number PCT/JP2019/031948 filed Aug. 14, 2019 and claims priority to Japanese Application Number 2018-200319 mailed Oct. 24, 2018.

TECHNICAL FIELD

The present invention relates to a prepreg automatic layering device.

Priority is claimed on Japanese Patent Application No. 2018-200319, filed Oct. 24, 2018, the content of which is incorporated herein by reference.

BACKGROUND ART

When a fuselage, a main wing, or the like of an aircraft is produced, a prepreg layered body, which is formed by layering a plurality of prepreg sheets which are fiber sheets infiltrated with resin, is used.

As the resin to be infiltrated into the fiber sheet, an ultraviolet curable resin, a thermosetting resin, or the like which is in a semi-cured state (incompletely cured state) and has adhesion is used.

The prepreg layered body is formed by removing a delamination sheet from prepreg sheets and integrally layering a plurality of the prepreg sheets while setting fiber directions to intersect each other.

Namely, the prepreg layered body is produced by repeating a step in which for example, a prepreg sheet (angled layer) of which the fiber direction is directed to 45 degrees or 90 degrees is layered on a prepreg sheet (0-degree layer) of which the fiber direction is directed to 0 degrees, and a prepreg sheet (0-degree layer) of which the fiber direction is directed to 0 degrees is layered thereon.

When the prepreg layered body is produced, a prepreg automatic layering device is used (for example, refer to PTL 1).

PTL 1 discloses a prepreg automatic layering device including a lay-up stage which extends in one direction and on the upper surface of which prepreg sheets are to be layered, and a prepreg layering head.

The prepreg layering head disclosed in PTL 1 includes a supply roller, a support roller, a rotary die cutter, a pair of guide rollers, a scraper roller, a plurality of compactors (layering shoes), and a delamination sheet recovery roller.

The supply roller supplies the prepreg sheet to which a delamination sheet is attached. The support roller supports the prepreg sheet to which the delamination sheet is attached.

The rotary die cutter is provided on a supply roller side. The rotary die cutter cuts the prepreg sheet only in a width direction such that the delamination sheet is not cut, to form a prepreg cut portion. For this reason, the width of the prepreg cut portion in a feed direction of the prepreg sheet is equal to the width of the prepreg sheet.

The pair of guide rollers guide the prepreg sheet fed from the support roller. The scraper roller delaminates the delamination sheet from the prepreg sheet.

The plurality of compactors (layering shoes) are provided to be able to advance and retreat in a fiber direction of the prepreg sheet. The plurality of compactors press the prepreg cut portion of the prepreg sheet, which is guided to a region between the pair of guide rollers, from a delamination sheet side to layer the prepreg cut portion on an upper surface of the lay-up stage or another prepreg sheet disposed on the lay-up stage.

The delamination sheet recovery roller recovers the delamination sheet.

CITATION LIST

Patent Literature

[PTL 1] Japanese Patent No. 5422439

SUMMARY OF INVENTION

Technical Problem

By the way, there may be a prepreg cut portion having a width narrower than the width of the prepreg sheet.

However, since the rotary die cutter disclosed in PTL 1 is a cutter that cuts the prepreg sheet only in the width direction, when the prepreg sheet is cut in the feed direction of the prepreg sheet, an operator manually cuts the prepreg sheet by using a cutter.

For this reason, a cutting operation in which the prepreg sheet is cut to form the prepreg cut portion is very complicated.

Therefore, an object of the present invention is to provide a prepreg automatic layering device capable of cutting out a prepreg cut portion having a width narrower than the width of a prepreg sheet from the prepreg sheet easily and in a short time.

Solution to Problem

In order to solve the above problem, according to one aspect of the present invention, there is provided a prepreg automatic layering device including: a lay-up stage extending in one direction; and a prepreg layering head including a feeding portion that feeds a prepreg sheet, which is affixed to one surface of a delamination sheet, onto the lay-up stage or another prepreg sheet disposed on the lay-up stage, a cutter portion that is provided downstream of the feeding portion and in a preceding stage of the lay-up stage and cuts the prepreg sheet only in a width direction to cut out a prepreg cutout portion in which a prepreg cut portion and an unnecessary portion are integrated, a winding portion that winds the delamination sheet delaminated from the prepreg sheet, and a plurality of compactors that are disposed in the one direction and move in a direction from a winding portion side toward a feeding portion side to press the prepreg cut portion with the delamination sheet interposed between the plurality of compactors and the prepreg cut portion. The prepreg layering head includes a cutting mechanism that is provided in the preceding stage of the lay-up stage and cuts the prepreg sheet in a feed direction of the prepreg sheet to separate a portion corresponding to the prepreg cut portion and a portion corresponding to the unnecessary portion from each other, and a control device that controls the cutting mechanism.

According to the present invention, the cutter portion that cuts the prepreg sheet only in the width direction, the cutting mechanism that is provided in the preceding stage of the lay-up stage and cuts the prepreg sheet in the feed direction of the prepreg sheet to separate the portion corresponding to the prepreg cut portion and the portion corresponding to the unnecessary portion from each other, and the control device that controls the cutting mechanism are provided. Therefore, the prepreg cut portion having a width narrower than the width of the prepreg sheet can be cut out automatically.

Accordingly, as compared with when an operator cuts a portion between the prepreg cut portion and the unnecessary portion with a cutter, the prepreg cut portion having a width narrower than the width of the prepreg sheet can be cut out easily and in a short time.

In addition, in the prepreg automatic layering device according to one aspect of the present invention, the cutting mechanism may include a base plate that is disposed between the feeding portion and the cutter portion and has an upper surface in contact with the other surface of the delamination sheet, a cutting portion in which a plurality of pressing rollers disposed above the base plate to come into contact with the prepreg sheet disposed on the base plate is integrated with a cutter main body that cuts a periphery of a region, which is pressed by the plurality of pressing rollers, in the feed direction of the prepreg sheet to separate the portion corresponding to the prepreg cut portion and the portion corresponding to the unnecessary portion from each other in the width direction of the prepreg sheet, and a lifting and lowering portion that is electrically connected to the control device to lift and lower the cutting portion with respect to the prepreg sheet.

As described above, the base plate having the upper surface in contact with the other surface of the delamination sheet, the plurality of pressing rollers that come into contact with the prepreg sheet disposed on the base plate, the cutter main body that cuts the periphery of the region, which is pressed by the plurality of pressing rollers, in the feed direction of the prepreg sheet to separate the portion corresponding to the prepreg cut portion and the portion corresponding to the unnecessary portion from each other in the width direction of the prepreg sheet, and the lifting and lowering portion that lifts and lowers the cutting portion with respect to the prepreg sheet are provided, so that the cutter main body cuts the periphery of the region pressed by the plurality of pressing rollers. Therefore, the position accuracy of the position of the prepreg sheet cut by the cutter main body can be improved.

In addition, since the plurality of pressing rollers and the cutter main body are integrally formed, the amount of projection of a tip of the cutter main body, which projects from lower ends of the pressing rollers, can be made constant such that the delamination sheet is not divided by the cutter main body. Accordingly, only the prepreg sheet can be stably divided while the delamination sheet is suppressed from being divided.

In addition, in the prepreg automatic layering device according to one aspect of the present invention, among the plurality of pressing rollers, a part of the pressing rollers may be disposed in the feed direction of the prepreg sheet to form a first row, and a remainder of the pressing rollers may be disposed to be adjacent to the pressing rollers, which form the first row, in the width direction of the prepreg sheet to form a second row. A gap may be formed between the first row and the second row. A tip portion of the cutter main body may be inserted into and disposed in the gap.

As described above, since the tip portion of the cutter main body is inserted into and disposed in the gap formed between the first row formed of the part of the pressing rollers and the second row formed of the remainder of the pressing rollers, the prepreg sheet located between the prepreg sheet pressed by the first row and the prepreg sheet pressed by the second row can be cut.

Accordingly, both sides in the width direction of the cutting position are pressed, so that the position accuracy of the cutting position of the cutter main body can be improved.

In addition, in the prepreg automatic layering device according to one aspect of the present invention, when the prepreg sheet is cut using the cutting mechanism, the control device may control the lifting and lowering portion such that the plurality of pressing rollers come into contact with the prepreg sheet and a tip of the cutter main body is disposed at a position which is located below the prepreg sheet and at which the delamination sheet is not divided.

Since the control device which performs such control is provided, only the prepreg sheet can be stably divided without the delamination sheet being divided.

In addition, in the prepreg automatic layering device according to one aspect of the present invention, the cutter main body may be an ultrasonic cutter.

As described above, when the ultrasonic cutter is used as the cutter main body, the prepreg sheet can be cut with high accuracy.

Advantageous Effects of Invention

According to the present invention, the prepreg cut portion having a width narrower than the width of the prepreg sheet can be cut out from the prepreg sheet easily and in a short time.

BRIEF DESCRIPTION OF DRAWINGS

FIG. 6 is a plan view for describing motions of a plurality of compactors.

DESCRIPTION OF EMBODIMENTS

Hereinafter, an embodiment to which the present invention is applied will be described in detail with reference to the drawings.

Embodiment

A prepreg automatic layering device 10 according to an embodiment of the present invention will be described with reference to FIGS. 1 to 6.

Figure 1:
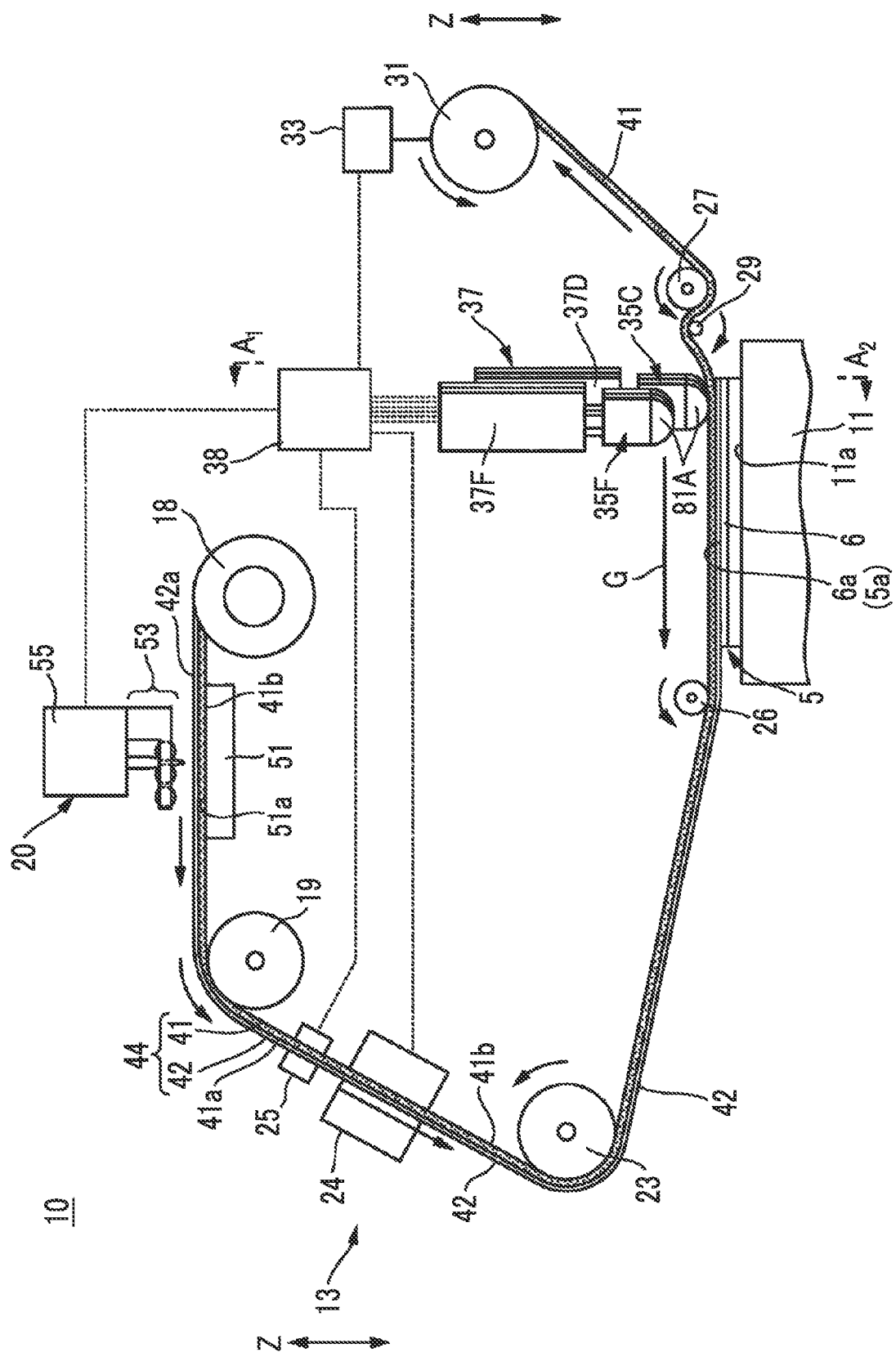
FIG. 1 is a side view schematically illustrating a schematic configuration of a prepreg automatic layering device according to an embodiment of the present invention.
Figure 2:
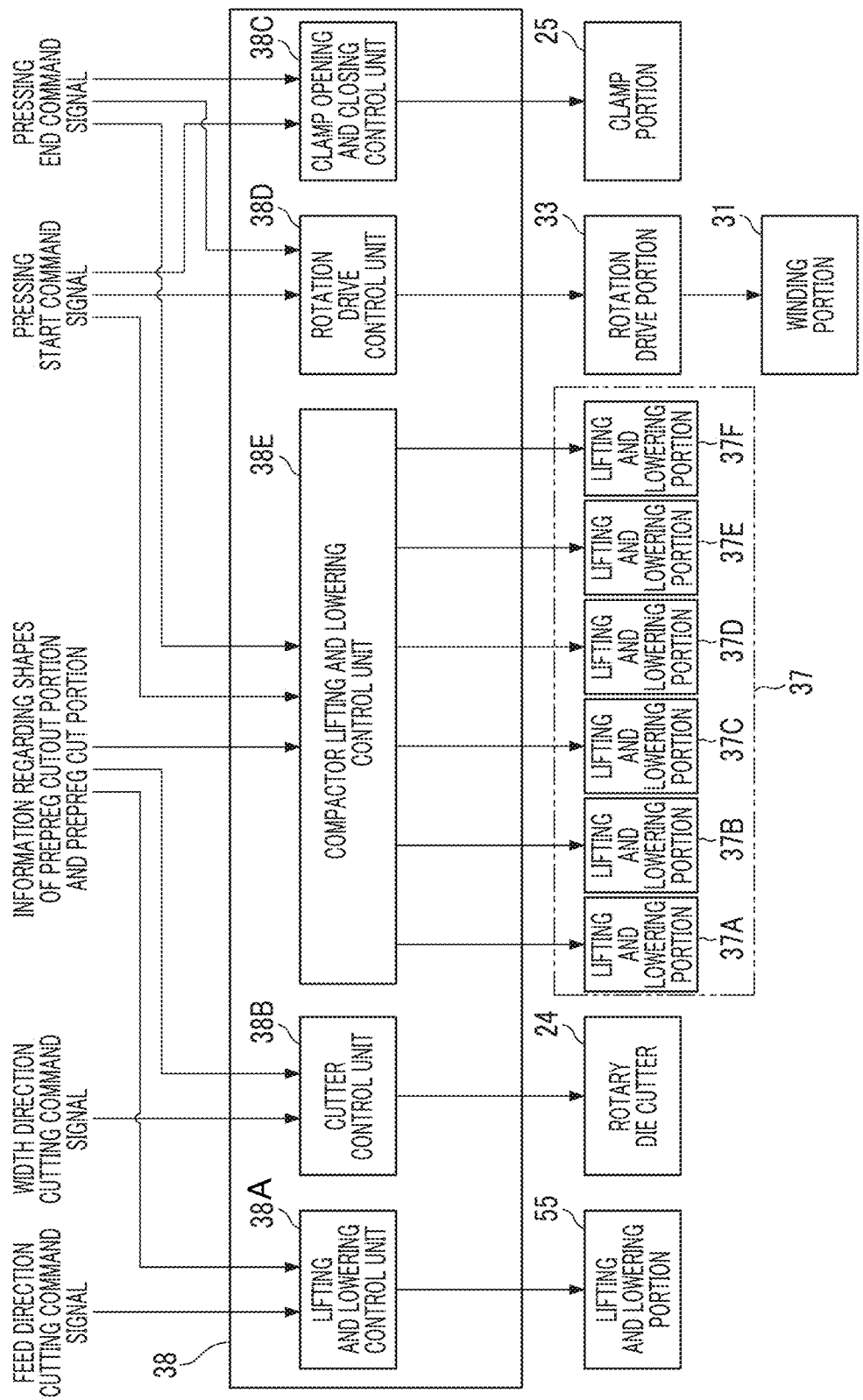
FIG. 2 is a functional block diagram of a control device illustrated in FIG. 1.

FIG. 1 is a view of the prepreg automatic layering device 10 of the present embodiment when seen in an F direction illustrated in FIG. 6. In FIG. 1, among a plurality of arrows, a part of arrows indicates a rotational direction of components forming the prepreg automatic layering device 10, and the remaining arrows indicate a feed direction of a delamination sheet 41 and a prepreg sheet 42.

In FIGS. 1 and 6, sign G indicates a direction in which compactors 35A to 35F move when a prepreg cut portion 42B is pressed.

Figure 4:
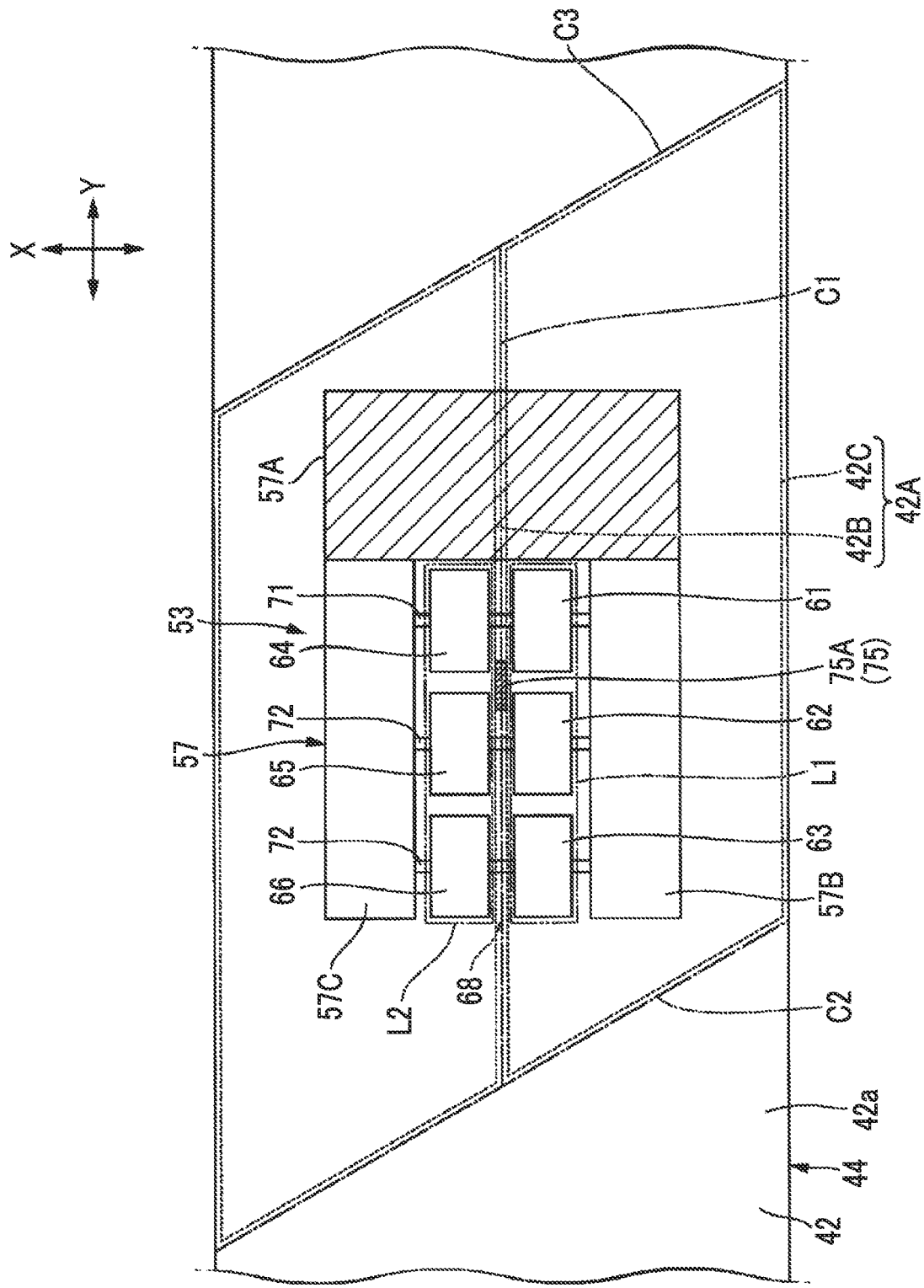
FIG. 4 is a cross-sectional view of a structure illustrated in FIG. 3 taken along a $B_1$-$B_2$ line direction.

In FIG. 4, sign C1 indicates a cutting position where a cutting mechanism 20 cuts the prepreg sheet 42 (hereinafter, referred to as a "cutting position C1"), and C2 and C3 indicate cutting positions where a rotary die cutter 24 which is a cutter portion cuts the prepreg sheet (hereinafter, referred to as "cutting positions C2 and C3").

In FIG. 6, the compactors 35C to 35F indicated by dotted lines indicate compactors that do not press the delamination sheet 41.

Figure 3:
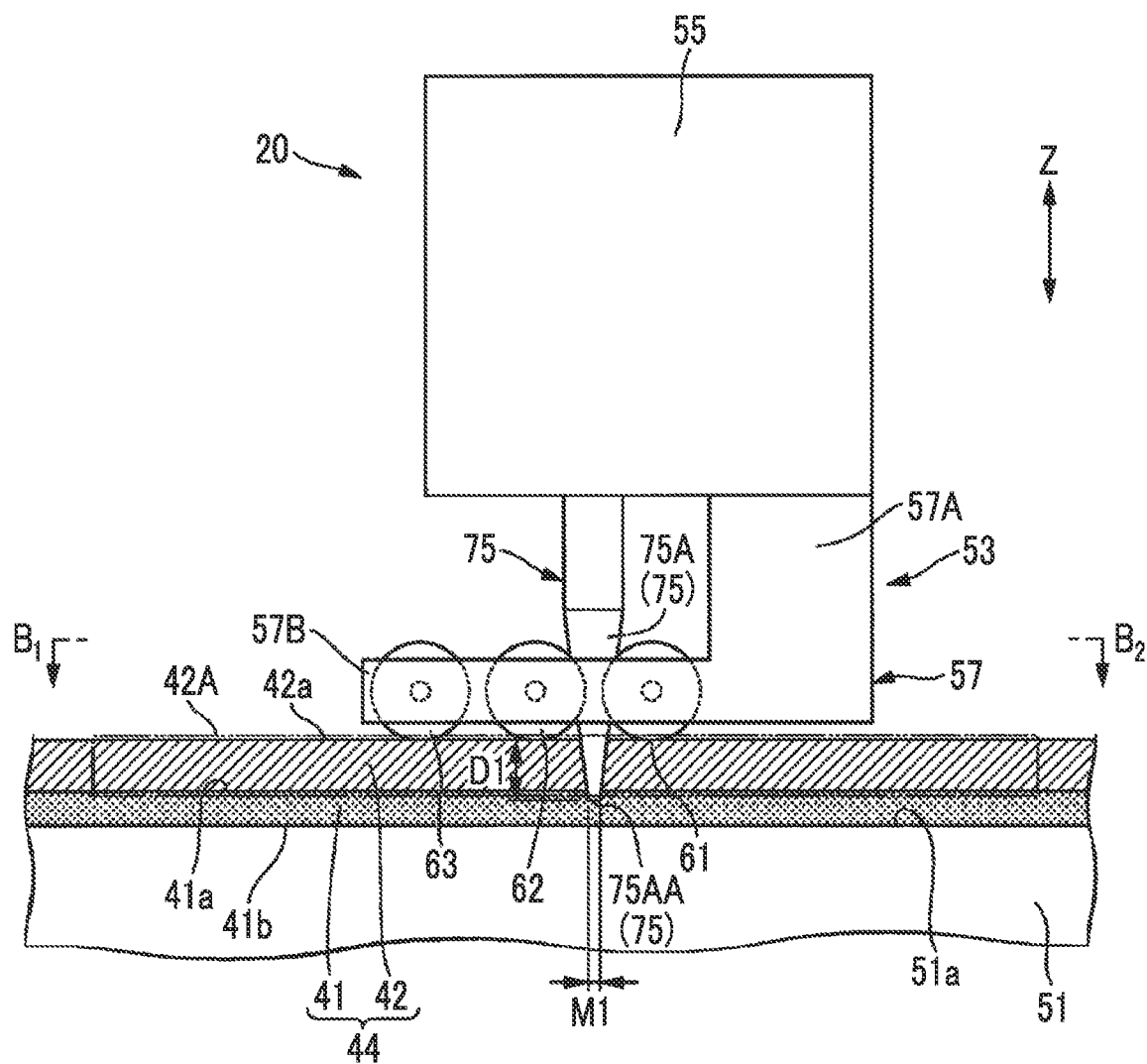
FIG. 3 is a view schematically illustrating a mode where a cutting mechanism illustrated in FIG. 1 cuts a prepreg sheet.
Figure 5:
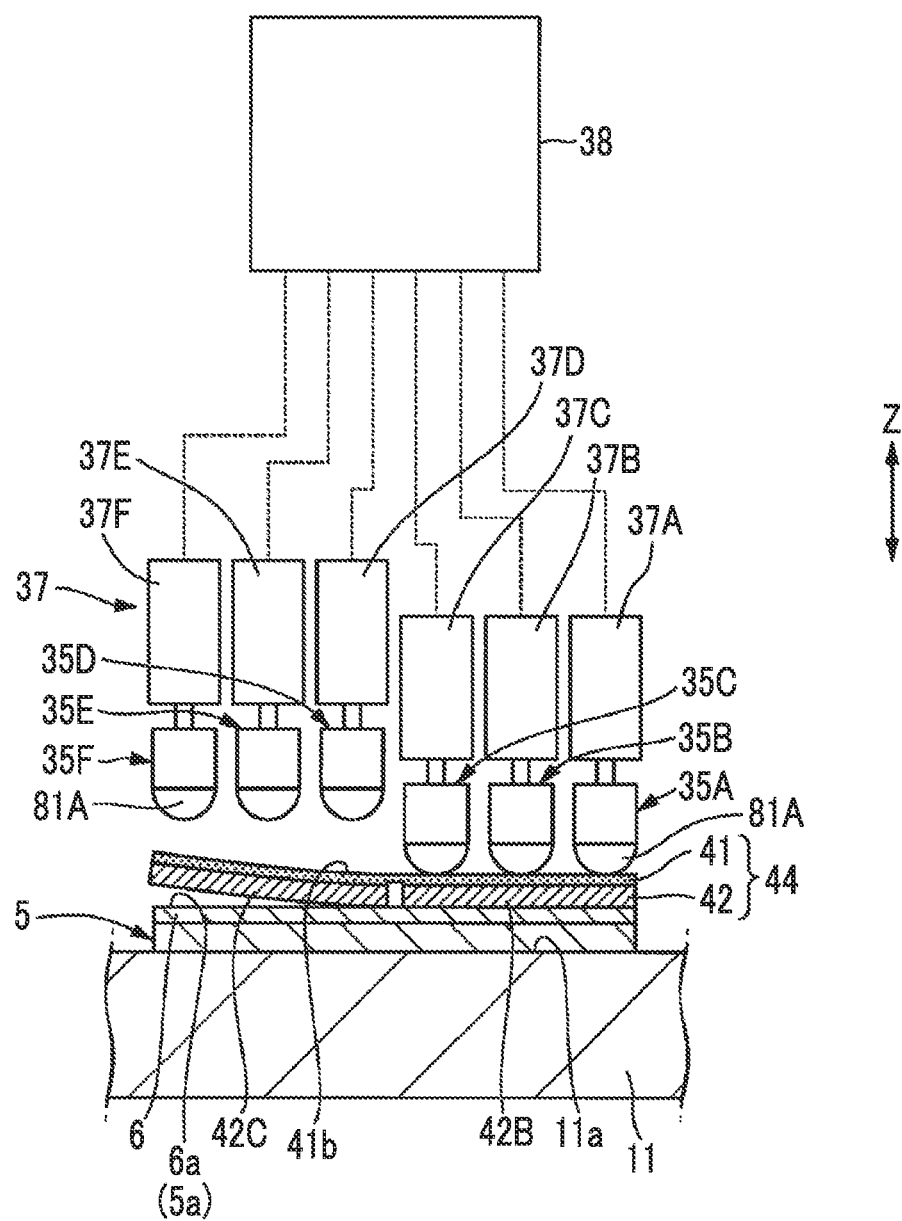
FIG. 5 is a cross-sectional view of a structure illustrated in FIG. 1 taken along an $A_1$-$A_2$ line direction.

In FIGS. 1, 3, and 5, Z indicates a vertical direction. In FIGS. 4 and 6, an X direction indicates a width direction of the prepreg sheet 42 which is orthogonal to a Z direction and a Y direction, and the Y direction indicates the feed direction of the prepreg sheet 42 which is orthogonal to the X direction and the Z direction.

In the present embodiment, as an example, a case where the prepreg cut portion 42B is layered on an upper surface 6a of another prepreg sheet 6 (upper surface 5a of a prepreg layered body 5 in the process of production) forming the uppermost layer of the prepreg layered body 5 in the process of production which is disposed on an upper surface 11a of a lay-up stage 11 and in which a plurality of prepreg sheets are layered will be described below.

The prepreg automatic layering device 10 includes the lay-up stage 11 and a prepreg layering head 13.

The lay-up stage 11 extends in the Y direction. The upper surface 11a of the lay-up stage 11 is a flat surface. The prepreg layered body 5 in the process of production is placed on the upper surface 11a of the lay-up stage 11. The upper surface 5a of the prepreg layered body 5 is formed of the upper surface 6a of the another prepreg sheet 6 forming the uppermost layer of the prepreg layered body 5.

The prepreg layering head 13 includes a feeding portion 18, support rollers 19 and 23, the cutting mechanism 20, the rotary die cutter 24 (cutter portion), a clamp portion 25, guide rollers 26 and 27, and a scraper roller 29, a winding portion 31, a rotation drive portion 33, the compactors 35A to 35F, a compactor lifting and lowering mechanism 37, and a control device 38.

The feeding portion 18 is provided on one side in a width direction of the lay-up stage 11 and above the lay-up stage 11. The feeding portion 18 is a columnar member that is rotatable around a rotation axis thereof.

A sheet member 44 is wound around an outer peripheral surface of the feeding portion 18. The sheet member 44 is configured such that the prepreg sheet 42 is affixed to one surface 41a of the delamination sheet 41. The delamination sheet 41 is disposed on a side facing the outer peripheral surface of the feeding portion 18.

The feeding portion 18 feeds the sheet member 44 in a direction toward the support roller 19.

The support roller 19 is provided on the one side in the width direction of the lay-up stage 11. The support roller 19 is disposed at a position separated from the feeding portion 18 to the one side in the width direction of the lay-up stage 11. An outer peripheral surface of the support roller 19 is in contact with the other surface 41b of the delamination sheet 41 forming the sheet member 44 fed from the feeding portion 18.

The support roller 19 has a columnar shape and is configured to be rotatable around a rotation axis thereof. The sheet member 44 located between the feeding portion 18 and the support roller 19 is supported on the support roller 19 so as to be horizontal.

The cutting mechanism 20 includes a base plate 51, a cutting portion 53, and a lifting and lowering portion 55.

The base plate 51 is provided at a position where the sheet member 44 located between the feeding portion 18 and the support roller 19 can be horizontally supported. The base plate 51 has an upper surface 51a that is in contact with the other surface 41b of the delamination sheet 41 forming the sheet member 44. The base plate 51 is supported on a support member (not illustrated), so that the position of the base plate 51 is regulated.

The cutting portion 53 is disposed above the prepreg sheet 42 disposed on the base plate 51.

The cutting portion 53 includes a roller supporting portion 57, pressing rollers 61 to 66 (a plurality of pressing rollers), a gap 68, rotary shafts 71 to 73, and a cutter main body 75.

The roller supporting portion 57 includes a fixing portion 57A and protrusion portions 57B and 57C.

The fixing portion 57A extends in the Z direction to be fixed to the lifting and lowering portion 55.

The protrusion portion 57B extends from a lower portion of the fixing portion 57A in the feed direction of the sheet member 44.

The protrusion portion 57C extends from the lower portion of the fixing portion 57A in the feed direction of the sheet member 44. The protrusion portion 57C faces the protrusion portion 57B with an interval between the protrusion portion 57C and the protrusion portion 57B in the width direction of the sheet member 44.

The pressing rollers 61 to 63 (a part of the plurality of pressing rollers) are arranged in order of the pressing roller 61, the pressing roller 62, and the pressing roller 63 in the direction from the feeding portion 18 toward the support roller 19. The pressing rollers 61 to 63 are disposed in a direction in which the pressing rollers 61 to 63 can transfer the sheet member 44. The pressing rollers 61 to 63 form a first row L1 extending in the feed direction of the sheet member 44.

The pressing rollers 61 to 63 are provided between the protrusion portion 57B and the protrusion portion 57C. The pressing rollers 61 to 63 are disposed on a protrusion portion 57B side.

The pressing rollers 64 to 66 (the remainder of the plurality of pressing rollers) are arranged in order of the pressing roller 64, the pressing roller 65, and the pressing roller 66 in the direction from the feeding portion 18 toward the support roller 19. The pressing rollers 64 to 66 are disposed in a direction in which the pressing rollers 64 to 66 can transfer the sheet member 44. The pressing rollers 64 to 66 form a second row L2 extending in the feed direction of the sheet member 44.

The pressing rollers 64 to 66 are provided between the first row L1 and the protrusion portion 57C. Namely, the pressing rollers 64 to 66 are disposed on a protrusion portion 57C side.

The pressing rollers 64 to 66 having the above configuration press the prepreg sheet 42 which is in a transferred state, in a state where the cutting portion 53 is lowered to cause the pressing rollers 64 to 66 to come into contact with one surface 42a of the prepreg sheet 42 (refer to FIG. 3).

On the other hand, when the cutting portion 53 is lifted from the state illustrated in FIG. 3, the pressing rollers 64 to 66 are separated above from the one surface 42a of the prepreg sheet 42 (refer to FIG. 1).

The gap 68 is formed between the first row L1 and the second row L2. The gap 68 extends in the feed direction of the sheet member 44. The size of the gap 68 in the width direction of the prepreg sheet 42 is such that a tip portion 75A of the cutter main body 75 can be inserted into the gap 68.

The rotary shaft 71 extends in the width direction of the prepreg sheet 42 and penetrates through the pressing rollers 61 and 64. One end of the rotary shaft 71 is rotatably supported on the protrusion portion 57B and the other end thereof is rotatably supported on the protrusion portion 57C.

Accordingly, when the pressing rollers 61 and 64 are rotated, the rotary shaft 71 also rotates together with the pressing rollers 61 and 64.

The rotary shaft 72 extends in the width direction of the prepreg sheet 42 and penetrates through the pressing rollers 62 and 65. One end of the rotary shaft 72 is rotatably supported on the protrusion portion 57B, and the other end thereof is rotatably supported on the protrusion portion 57C.

Accordingly, when the pressing rollers 62 and 65 rotate, the rotary shaft 72 also rotates together with the pressing rollers 62 and 65.

The rotary shaft 73 extends in the width direction of the prepreg sheet 42 and penetrates through the pressing rollers 63 and 66. One end of the rotary shaft 73 is rotatably supported on the protrusion portion 57B, and the other end thereof is rotatably supported on the protrusion portion 57C.

Accordingly, when the pressing rollers 63 and 66 rotate, the rotary shaft 73 also rotates together with the pressing rollers 63 and 66.

The cutter main body 75 is used to cut the prepreg sheet 42 in the feed direction of the sheet member 44. The cutter main body 75 extends in the Z direction and is disposed at the center in the width direction of the prepreg sheet 42.

The tip portion 75A of the cutter main body 75 is inserted into the gap 68. A tip 75AA of the tip portion 75A protrudes downward from the pressing rollers 61 to 66 to cut the prepreg sheet 42.

The amount of protrusion of the tip 75AA with respect to lower ends of the pressing rollers 61 to 66 can be appropriately set in consideration of the thickness of the prepreg sheet 42 and the thickness of the delamination sheet 41.

Specifically, the amount of protrusion of the tip 75AA is sized such that the prepreg sheet 42 can be divided in a thickness direction and the delamination sheet 41 is not divided (sized such that only a part in the thickness direction of the delamination sheet 41 can be cut).

The cutter main body 75 having the above configuration comes into contact with the prepreg sheet 42 moving in the feed direction, to cut the prepreg sheet 42 at the cutting position C1 located at a central portion of a portion of the prepreg sheet 42, the portion corresponding to a prepreg cutout portion 42A.

The prepreg cutout portion 42A has a structure where the prepreg cut portion 42B layered on the upper surface 6a of the another prepreg sheet 6 and an unnecessary portion 42C which is an unnecessary portion are integrally formed.

For example, an ultrasonic cutter can be used as the cutter main body 75.

As described above, when the ultrasonic cutter is used as the cutter main body 75, the prepreg sheet 42 can be cut with high accuracy.

For example, when the thickness of the delamination sheet is 0.07 mm, the thickness of the prepreg sheet 42 is 0.19 mm, and the cutter main body 75 is an ultrasonic cutter, a depth D1 of the tip portion 75A of the cutter main body 75 which is inserted into the sheet member 44 can be, for example, 0.25 mm.

In this case, a length M1 of the tip of the cutter main body 75 can be, for example, 0.25 mm or more.

The lifting and lowering portion 55 is provided on the cutting portion 53 and is connected to the cutting portion 53.

The lifting and lowering portion 55 lifts and lowers the cutting portion 53 with respect to the sheet member 44.

The support roller 23 is provided on the one side in the width direction of the lay-up stage 11. The support roller 23 is disposed at a position that is located below the position of the support roller 19 and is farther separated from the lay-up stage 11 in the X direction than the support roller 19.

The support roller 23 has a columnar shape and is configured to be rotatable around a rotation axis thereof. An outer peripheral surface of the support roller 23 is in contact with the other surface 41b of the delamination sheet 41 forming the sheet member 44 transferred via the support roller 19.

The support roller 23 supports the sheet member 44 such that the sheet member 44 transferred via the support roller 19 faces an upper surface 6a side of the another prepreg sheet 6.

The rotary die cutter 24 is provided between the support roller 19 and the support roller 23. The rotary die cutter 24 cuts the prepreg sheet 42 forming the sheet member 44 in the width direction, the prepreg sheet 42 being disposed between the support roller 19 and the support roller 23.

The rotary die cutter 24 cuts the prepreg sheet 42 at the cutting positions C2 and C3 to cut out the prepreg cutout portion 42A cut at the cutting position C1, so that the prepreg cut portion 42B and the unnecessary portion 42C separated from each other are formed.

The prepreg cut portion 42B and the unnecessary portion 42C are transferred to the support roller 23 disposed in a following stage of the rotary die cutter 24, in a state where the prepreg cut portion 42B and the unnecessary portion 42C are affixed to the delamination sheet 41.

Incidentally, when the cutting mechanism 20 is not provided, the rotary die cutter 24 cuts out the prepreg cutout portion 42A in which the prepreg cut portion 42B and the unnecessary portion 42C are integrated.

The clamp portion 25 is disposed between the support roller 19 and the rotary die cutter 24. The clamp portion 25 clamps the sheet member 44 located between the support roller 19 and the rotary die cutter 24, to regulate the position of the sheet member 44.

The guide roller 26 is provided on the one side in the width direction of the lay-up stage 11. The guide roller 26 is disposed at a position that is lower than the support roller 23 and is closer to the lay-up stage 11 than the support roller 23.

The guide roller 26 has a columnar shape and is configured to be rotatable around a rotation axis thereof. An outer peripheral surface of the guide roller 26 is in contact with the other surface 41b of the delamination sheet 41 forming the sheet member 44. The guide roller 26 guides the prepreg sheet 42 to the upper surface 6a of the another prepreg sheet 6.

The guide roller 27 is provided on the other side in the width direction of the lay-up stage 11. The guide roller 27 has a columnar shape and is configured to be rotatable around a rotation axis thereof. An outer peripheral surface of the guide roller 27 is in contact with the other surface 41b of the delamination sheet 41. The guide roller 27 guides the delamination sheet 41 in a direction toward the winding portion 31.

The scraper roller 29 is provided on the other side in the width direction of the lay-up stage 11. The scraper roller 29 is provided between the guide roller 27 and the lay-up stage 11.

The scraper roller 29 has a columnar shape and is configured to be rotatable around a rotation axis thereof. An outer peripheral surface of the scraper roller 29 is in contact with the one surface 41a of the delamination sheet 41. The scraper roller 29 delaminates the delamination sheet 41 from the prepreg sheet 42.

The winding portion 31 is disposed at a position which is located above the guide roller 27 and is farther separated from the lay-up stage 11 than the guide roller 27.

The winding portion 31 has a columnar shape and is configured to be rotatable around a rotation axis thereof. An outer peripheral surface of the winding portion 31 is in contact with the other surface 41b of the delamination sheet 41. When the winding portion 31 rotates, the delamination sheet 41 is wound.

The rotation drive portion 33 is a drive portion that rotates the winding portion 31. When the winding portion 31 is rotated by the rotation drive portion 33, the delamination sheet 41 is wound. When the rotation of the winding portion 31 is stopped, the winding of the delamination sheet 41 is stopped.

The compactors 35A to 35F are disposed to be adjacent to each other in order of the compactor 35A, the compactor 35B, the compactor 35C, the compactor 35D, the compactor 35E, and the compactor 35F in the Y direction from the prepreg cut portion 42B toward the unnecessary portion 42C.

The compactors 35A to 35F are disposed above the sheet member 44 located above the lay-up stage 11. The compactors 35A to 35F each are configured to be independent from other compactors (four compactors out of the compactors 35A to 35F). Accordingly, the compactors 35A to 35F each are configured to be liftable and lowable independently from the other compactors.

The compactors 35A to 35F each include a protrusion 81A that forms a lower portion of each of the compactors 35A to 35F and has an arc shape protruding in a direction from above to below.

When the protrusions 81A press the delamination sheet 41, only the prepreg cut portion 42B is pressed with the delamination sheet 41 interposed therebetween.

When the prepreg cut portion 42B is pressed, the compactors 35A to 35F move integrally in a G direction.

Incidentally, the prepreg automatic layering device 10 includes a head direction adjusting mechanism (not illustrated) that changes the direction of the prepreg layering head 13 (direction in which the sheet member 44 is supplied) with respect to a direction in which the lay-up stage 11 or the another prepreg sheet 6 extends.

When the head direction adjusting mechanism changes the direction of the prepreg layering head 13, the direction of the compactors 35A to 35F is changed to face a direction opposite a supply direction of the sheet member 44.

The compactor lifting and lowering mechanism 37 includes lifting and lowering portions 37A to 37F.

The lifting and lowering portion 37A is provided above the compactor 35A and is connected to the compactor 35A. The lifting and lowering portion 37A lifts and lowers only the compactor 35A.

The lifting and lowering portion 37B is provided above the compactor 35B and is connected to the compactor 35B. The lifting and lowering portion 37B lifts and lowers only the compactor 35B.

The lifting and lowering portion 37C is provided above the compactor 35C and is connected to the compactor 35C. The lifting and lowering portion 37C lifts and lowers only the compactor 35C.

The lifting and lowering portion 37D is provided above the compactor 35D and is connected to the compactor 35D. The lifting and lowering portion 37D lifts and lowers only the compactor 35D.

The lifting and lowering portion 37E is provided above the compactor 35E and is connected to the compactor 35E. The lifting and lowering portion 37E lifts and lowers only the compactor 35E.

The lifting and lowering portion 37F is provided above the compactor 35F and is connected to the compactor 35F. The lifting and lowering portion 37F lifts and lowers only the compactor 35F.

The control device 38 includes a lifting and lowering control unit 38A, a cutter control unit 38B, a clamp opening and closing control unit 38C, a rotation drive control unit 38D, and a compactor lifting and lowering control unit 38E.

The lifting and lowering control unit 38A is electrically connected to the lifting and lowering portion 55.

When the lifting and lowering control unit 38A receives information regarding the shapes of the prepreg cutout portion 42A and the prepreg cut portion 42B and receives a feed direction cutting command signal, the lifting and lowering control unit 38A controls the lifting and lowering portion 55 to lower the cutting portion 53.

At this time, the cutting portion 53 is lowered to a position where the prepreg cutout portion 42A can be pressed by the pressing rollers 61 to 66 and the cutter main body 75 can divide the prepreg sheet 42.

Then, in a state where the prepreg cutout portion 42A is pressed by the pressing rollers 61 to 66, the prepreg sheet 42 is cut at the cutting position C1 of the prepreg cutout portion 42A by the cutter main body 75.

Thereafter, the lifting and lowering control unit 38A controls the cutting portion 53 to be lifted, so that the pressing rollers 61 to 66 and the cutter main body 75 are separated from the prepreg sheet 42.

The cutter control unit 38B is electrically connected to the rotary die cutter 24. When the cutter control unit 38B receives the information regarding the shapes of the prepreg cutout portion 42A and the prepreg cut portion 42B and receives a width direction cutting command signal, the rotary die cutter 24 is used to cut portions of the prepreg sheet 42, the portions corresponding to the cutting positions C2 and C3.

Accordingly, the prepreg cut portion 42B and the unnecessary portion 42C are cut out.

The clamp opening and closing control unit 38C is electrically connected to the clamp portion 25. When a pressing start command signal (signal to start the pressing of the prepreg cut portion 42B) is input to the clamp opening and closing control unit 38C, the clamp opening and closing control unit 38C controls the clamp portion 25 to clamp the sheet member 44 to regulate the position of the sheet member 44.

In addition, when a pressing end command signal (signal to end the pressing of the prepreg cut portion 42B) is input to the clamp opening and closing control unit 38C, the clamp opening and closing control unit 38C controls the clamp portion 25 to release the clamping of the sheet member 44.

The rotation drive control unit 38D is electrically connected to the rotation drive portion 33. When the pressing start command signal is input to the rotation drive control unit 38D, the rotation drive control unit 38D controls the rotation drive portion 33 to stop the rotation of the winding portion 31.

In addition, when the pressing end command signal is input to the rotation drive control unit 38D, the rotation drive control unit 38D controls the rotation drive portion 33 to restart the rotation of the winding portion 31.

The compactor lifting and lowering control unit 38E is electrically connected to each of the lifting and lowering portions 37A to 37F. The compactor lifting and lowering control unit 38E independently controls each of the lifting and lowering portions 37A to 37F.

The compactor lifting and lowering control unit 38E controls each of the lifting and lowering portions 37A to 37F based on a drive program corresponding to various shapes of the prepreg cut portion 42B.

The drive program includes information regarding the positions in a height direction of the compactors 35A to 35F in an initial state, information on moving speed, and the like.

When the information regarding the shape of the prepreg cut portion 42B is input to the compactor lifting and lowering control unit 38E, the compactor lifting and lowering control unit 38E controls the lifting and lowering portions 37A to 37F to lift and lower the compactors 35A to 35F during a period from the start of pressing to the end of pressing of the prepreg cut portion 42B.

Here, referring to FIGS. 5 and 6, a process of pressing the prepreg cut portion 42B, which is to be performed by the control device 38, will be described as an example based on when the prepreg cut portion 42B having a parallelogram shape and having half the width of the prepreg sheet 42 is pressed.

Initially, when the control device 38 receives the pressing start command signal, the clamp opening and closing control unit 38C causes the sheet member 44 to be clamped, and the rotation drive control unit 38D causes the rotation of the winding portion 31 to stop. Accordingly, the tension applied to the sheet member 44 is smaller the tension applied thereto when the sheet member 44 is wound.

As described above, since the tension applied to the sheet member 44 is reduced before the pressing of the prepreg cut portion 42B is started, when among the compactors 35A to 35F, only a part of the compactors presses the prepreg cut portion 42B, shearing force generated in the sheet member 44 can be reduced. Accordingly, damage to the sheet member 44 can be suppressed.

Next, the compactor lifting and lowering control unit 38E controls the lifting and lowering portions 37A to 37C to lower the compactors 35A to 35C to a position where the compactors 35A to 35C located above the prepreg cut portion 42B at a pressing start position (end of the prepreg cut portion 42B, which is located on the other side in the width direction) can press the delamination sheet 41, and causes the compactors 35D to 35F to be lifted to a position where the compactors 35D to 35F located above the unnecessary portion 42C is separated from the delamination sheet 41 located above the unnecessary portion 42C.

Thereafter, while the positions in the height direction of the compactors 35A to 35F are maintained, the compactors 35A to 35F move in the G direction to press only the prepreg cut portion 42B. Accordingly, the process of pressing the prepreg cut portion 42B is completed.

As described above, since the unnecessary portion 42C is not pressed and only the prepreg cut portion 42B is pressed, the delamination of the prepreg sheet 42 (delamination of the prepreg sheet 42 from the delamination sheet 41) caused by the pressing of the unnecessary portion 42C can be suppressed.

The prepreg automatic layering device 10 of the present embodiment includes the rotary die cutter 24 (cutter portion) that cuts the prepreg sheet 42 only in the width direction, the cutting mechanism 20 that is provided in a preceding stage of the lay-up stage 11 and cuts the prepreg sheet 42 in the feed direction of the prepreg sheet 42 to separate a portion corresponding to the prepreg cut portion 42B and a portion corresponding to the unnecessary portion 42C from each other, and the control device 38 that controls the cutting mechanism 20. Therefore, the prepreg cut portion 42B having a width narrower than the width of the prepreg sheet 42 can be cut out automatically.

Accordingly, as compared with when an operator cuts a portion between the prepreg cut portion 42B and the unnecessary portion 42C with a cutter, the prepreg cut portion 42B having a width narrower than the width of the prepreg sheet 42 can be cut out easily and in a short time.

In addition, the cutting mechanism 20 includes the base plate 51 having the upper surface 51a in contact with the other surface 41b of the delamination sheet 41, the pressing rollers 61 to 66 that come into contact with the prepreg sheet 42 disposed on the base plate 51, the cutter main body 75 that cut a region of the prepreg sheet 42, which is pressed by the pressing rollers 61 to 66, in the feed direction of the prepreg sheet 42 so as to separate the prepreg sheet 42 into the portion corresponding to the prepreg cut portion 42B and the portion corresponding to the unnecessary portion 42C, and the lifting and lowering portion 55 that lifts and lowers the cutting portion 53 with respect to the prepreg sheet 42, so that the cutter main body 75 cuts the prepreg sheet 42 pressed by the pressing rollers 61 to 66. Therefore, the position accuracy of the cutting position C1 of the prepreg sheet 42 cut by the cutter main body 75 can be improved.

In addition, since the pressing rollers 61 to 66 and the cutter main body 75 are integrally formed, the amount of projection of the tip 75AA of the cutter main body 75, which projects from the lower ends of the pressing rollers 61 to 66, can be made constant such that the delamination sheet 41 is not cut by the cutter main body 75. Accordingly, only the prepreg sheet 42 can be stably divided while the delamination sheet 41 is suppressed from being divided.

In addition, since the tip portion 75A of the cutter main body 75 is inserted into and disposed in the gap 68 formed between the first row L1 formed of the pressing rollers 61 to 63 and the second row L2 formed of the pressing rollers 64 to 66, the prepreg sheet 42 located between the prepreg cut portion 42B pressed by the first row L1 and the prepreg cut portion 42B pressed by the second row L2 can be cut using the cutter main body 75.

In addition, when the prepreg cut portion 42B is cut using the cutting mechanism 20, the control device 38 controls the lifting and lowering portion 55 such that the pressing rollers 61 to 66 come into contact with the prepreg cut portion 42B with the delamination sheet 41 interposed therebetween and the tip 75AA of the cutter main body 75 is disposed at a position which is located below the prepreg sheet 42 and at which the delamination sheet 41 is not divided. Therefore, only the prepreg sheet 42 can be stably cut without the delamination sheet 41 being divided.

An exemplary embodiment of the present invention has been described in detail above; however, the present invention is not limited to such a specific embodiment, and various modifications and changes can be made without departing the concept of the present invention described in the claims.

INDUSTRIAL APPLICABILITY

The present invention is applicable to the prepreg automatic layering device.

REFERENCE SIGNS LIST

5 Prepreg layered body
5a, 6a, 11a, 51a Upper surface
6 Another prepreg sheet
10 Prepreg automatic layering device
11 Lay-up stage
13 Prepreg layering head
18 Feeding portion
19, 23 Support roller
20 Cutting mechanism
24 Rotary die cutter
25 Clamp portion
26, 27 Guide roller
29 Scraper roller
31 Winding portion
33 Rotation drive portion
35A to 35F Compactor
37 Compactor lifting and lowering mechanism
37A to 37F Lifting and lowering portion
38 Control device
38A Lifting and lowering control unit
38B Cutter control unit
38C Clamp opening and closing control unit
38D Rotation drive control unit
38E Compactor lifting and lowering control unit
41 Delamination sheet
41a, 42a One surface
41b The other surface
42 Prepreg sheet
42A Prepreg cutout portion
42B Prepreg cut portion
42C Unnecessary portion
44 Sheet member
51 Base plate
53 Cutting portion
55 Lifting and lowering portion
57 Roller supporting portion
57A Fixing portion
57B, 57C Protrusion portion
61-63 Pressing roller
68 Gap
75 Cutter main body
75A Tip portion
75AA Tip
81A Protrusion
C1 to C3 Cutting position
D1 Depth
G Direction
L1 First row
L2 Second row
M1 Length

The invention claimed is:

1. A prepreg automatic layering device comprising:
a lay-up stage extending in one direction; and
a prepreg layering head including a feeding portion that feeds a prepreg sheet, which is affixed to one surface of a delamination sheet, onto the lay-up stage or another prepreg sheet disposed on the lay-up stage, a cutter portion that is provided downstream of the feeding portion and in a preceding stage of the lay-up stage and cuts the prepreg sheet only in a width direction to cut out a prepreg cutout portion in which a prepreg cut portion and an unnecessary portion are integrated, a winding portion that winds the delamination sheet delaminated from the prepreg sheet, and a plurality of compactors that are disposed in the one direction and move in a direction from a winding portion side toward a feeding portion side to press the prepreg cut portion with the delamination sheet interposed between the plurality of compactors and the prepreg cut portion,
wherein the prepreg layering head includes a cutting mechanism that is provided in the preceding stage of the lay-up stage and cuts the prepreg sheet in a feed direction of the prepreg sheet to separate a portion corresponding to the prepreg cut portion and a portion corresponding to the unnecessary portion from each other, and
a control device that controls the cutting mechanism.

2. The prepreg automatic layering device according to claim 1,
wherein the cutting mechanism includes a base plate that is disposed between the feeding portion and the cutter portion and has an upper surface in contact with the other surface of the delamination sheet,
a cutting portion in which a plurality of pressing rollers disposed above the base plate to come into contact with the prepreg sheet disposed on the base plate is integrated with a cutter main body that cuts a region, which is pressed by the plurality of pressing rollers, in the feed direction of the prepreg sheet to separate the portion corresponding to the prepreg cut portion and the portion corresponding to the unnecessary portion from each other in the width direction of the prepreg sheet, and
a lifting and lowering portion that is electrically connected to the control device to lift and lower the cutting portion with respect to the prepreg sheet.

3. The prepreg automatic layering device according to claim 2,
wherein among the plurality of pressing rollers, a part of the pressing rollers is disposed in the feed direction of the prepreg sheet to form a first row, and a remainder of the pressing rollers is disposed to be adjacent to the pressing rollers, which form the first row, in the width direction of the prepreg sheet to form a second row,
a gap is formed between the first row and the second row, and
a tip portion of the cutter main body is inserted into and disposed in the gap.

4. The prepreg automatic layering device according to claim 2,
wherein when the prepreg sheet is cut using the cutting mechanism, the control device controls the lifting and lowering portion such that the plurality of pressing rollers come into contact with the prepreg sheet and a tip of the cutter main body is disposed at a position which is located below the prepreg sheet and at which the delamination sheet is not divided.

5. The prepreg automatic layering device according to claim 2,
wherein the cutter main body is an ultrasonic cutter.

6. The prepreg automatic layering device according to claim 3,
wherein when the prepreg sheet is cut using the cutting mechanism, the control device controls the lifting and lowering portion such that the plurality of pressing rollers come into contact with the prepreg sheet and a tip of the cutter main body is disposed at a position which is located below the prepreg sheet and at which the delamination sheet is not divided.

7. The prepreg automatic layering device according to claim 3,
wherein the cutter main body is an ultrasonic cutter.

8. The prepreg automatic layering device according to claim 4,
wherein the cutter main body is an ultrasonic cutter.

9. The prepreg automatic layering device according to claim 6,
wherein the cutter main body is an ultrasonic cutter.

* * * * *